W. B. PORTER.
COMPO BOARD MACHINE.
APPLICATION FILED FEB. 2, 1921.

1,427,971.

Patented Sept. 5, 1922.
5 SHEETS—SHEET 2.

Fig. 6

Patented Sept. 5, 1922.

1,427,971

UNITED STATES PATENT OFFICE.

WILLIAM B. PORTER, OF MINNEAPOLIS, MINNESOTA.

COMPO-BOARD MACHINE.

Application filed February 2, 1921. Serial No. 441,959.

*To all whom it may concern:*

Be it known that I, WILLIAM B. PORTER, a citizen of the United States, residing at Minneapolis, in the county of Hennepin and State of Minnesota, have invented certain new and useful Improvements in Compo-Board Machines; and I do hereby declare the following to be a full, clear, and exact description of the invention, such as will enable others skilled in the art to which it appertains to make and use the same.

My invention provides an improved machine for making compo board of the type wherein wooden strips are cemented to and secured between heavy paper facing sheets, and has for its object to make feasible and practical the making of a compo board by a continuous action and the sawing or cutting of the same into sections of the proper length without interrupting the continuous operation by which it is produced.

Generally stated, the invention consists of the novel devices and combinations of devices hereinafter described and defined in the claims. The invention is directed chiefly (*a*) to an improved continuously movable endless belt press, (*b*) to an improved sawing mechanism, and (*c*) to a novel cooperative relation or combination between the endless belt press and said sawing mechanism. The mechanism for feeding the paper facing strips and the slats and applying the glue may be of any suitable or well known construction and arrangement, so far as this invention is concerned.

The continuously acting endless belt press permits continuous or uninterrupted assembling and feed movements of the compo board elements and holds the same tightly pressed together while subject to movement for a long enough period to permit the glue to set at least sufficiently to hold the compo board elements together.

The saw and its driving mechanism are arranged to travel with the moving sheet of compo board while performing the sawing or cutting operation, so that the said movement of the compo board is not interrupted or delayed by the sawing action.

A commercial form of the machine above outlined is illustrated in the accompanying drawings, wherein like characters indicate like parts throughout the several views.

Referring to the drawings.

The machine, as shown, is installed in a building having at least two floors 11 and 12. The feed spout 13, for the delivery of the slats or wooden strips *y*, is, as shown, extended vertically and through the upper floor 12 and, at its lower end, delivers onto a horizontal feed table 14 supported on the lower floor 11. From the bottom of the spout 13, the slats or wooden strips are fed substantially continuously by a reciprocating feed blade 15 operated by a crank-equipped shaft 16 driven from a belt 17.

The upper paper sheet $y^1$ is fed from a roll mounted on a suitable support 18 secured on the upper floor 12, and is directed by suitable guide wheels against a belt-driven glue-applying roller 19 and thence under a guide roller 20 that directs the glue-covered face of said sheet against the top of the horizontal layer of wooden slats that are being fed rearward on the table 14.

Figure 1:
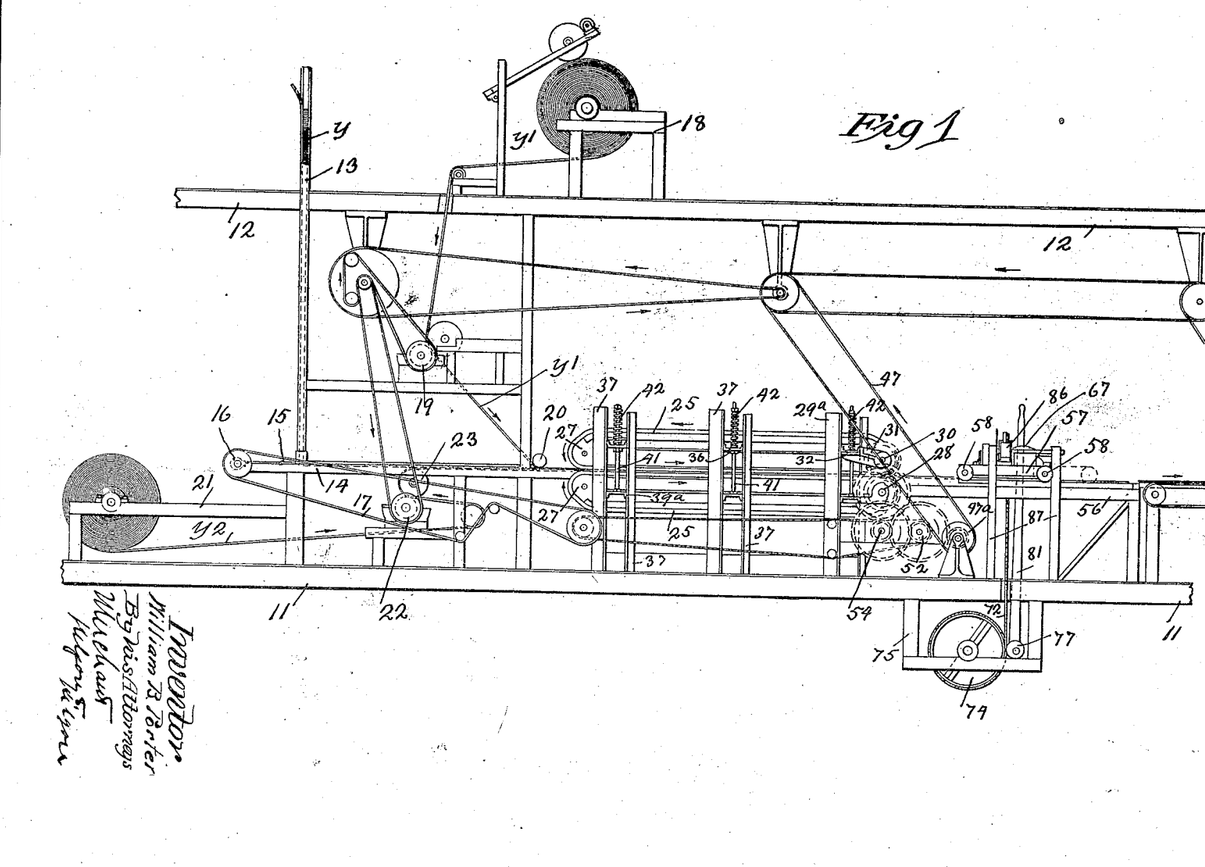
Fig. 1 is a side elevation of the complete machine.

The lower paper sheet $y^2$ is fed from a roll mounted on a suitable bearing 21 on the lower floor 11 and from thence is directed by suitable guide rollers against a glue-applying roller 22, see Fig. 1, and from thence over a guide roller 23 that directs the said sheet $y^2$, with its glue-covered face, against the under surface of the horizontal layer of slats, it being understood that the table 14 would be cut away to clear the upper horizontal portion of said strip $y^2$. The slat and paper-feeding mechanism above described in a general way, being of known and frequently used construction and constituting no part per se of the present invention, is thought to be sufficiently indicated by the foregoing description.

The board-forming elements, to wit: the upper paper sheet $y^1$, lower paper sheet $y^2$ and interposed slats $y$, assembled as described, are fed between the two endless belts of the continuously acting press, and which press, as commercially designed, is constructed as follows: The upper and lower belts are made up each of laterally spaced sprocket chains 24 and heavy cross bars 25 that are secured to the respective links by pivot pins 26, which latter project beyond the sides of the chain links so that they will engage between the teeth of co-operating sprockets 27. Each sprocket 27 is bifurcated or circumferentially curved so that the chain links will run between its teeth and the pivot pins 26 engage the notches between teeth. There is a laterally spaced pair of front and rear sprockets for each belt. The bars 25 will come tight together when the chains are straight and will resist bulging movements away from the compo board that is pressed between the rearwardly movable opposing portions of the belts.

The lower rear sprockets 27 are secured on a transverse shaft 28 that is journaled in suitable bearings on laterally spaced frame structures 29. The upper rear sprockets 27 are secured on a transverse shaft 30 journaled in bearing brackets 31 that are secured to the ends of the transverse beam 32 mounted to move vertically between upright portions of the frame structures 29.

The projecting ends of the lower bars 25 of the upper presser belt run under laterally spaced horizontal beams 33 provided at their front ends with adjustable bearing plates 34. The upper front sprockets 27 are secured to a transverse shaft 35 that is journaled in the rear ends of the adjustable bearing plates 34.

At their intermediate and front portions, the beams 33 are cross-connected by tie bars 36, preferably riveted or otherwise secured to the upper flanges thereof. The projecting ends of the tie bars 32 and 36 are guided for vertical movements, respectively, by rigidly secured upright guide posts $29^a$ and 37, that form parts of the rigid framework of the press.

Figure 4:
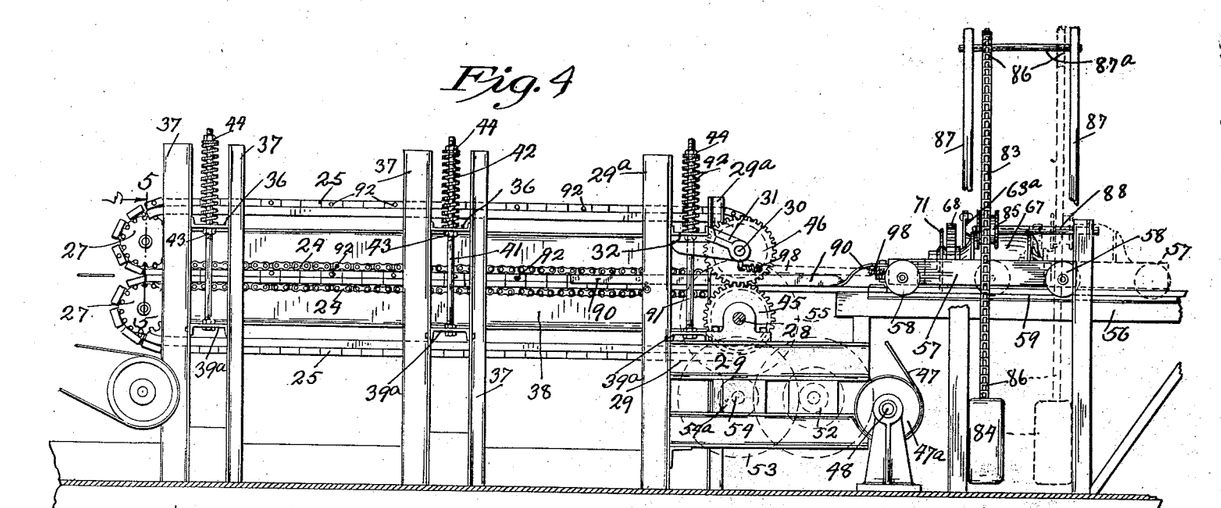
Fig. 4 is a side elevation of the parts shown in Fig. 2.
Figure 5:
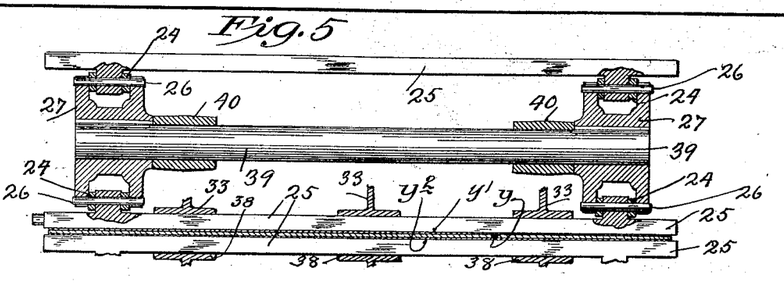
Fig. 5 is an enlarged section taken on the line 5—5 of Fig. 4.
Figure 6:
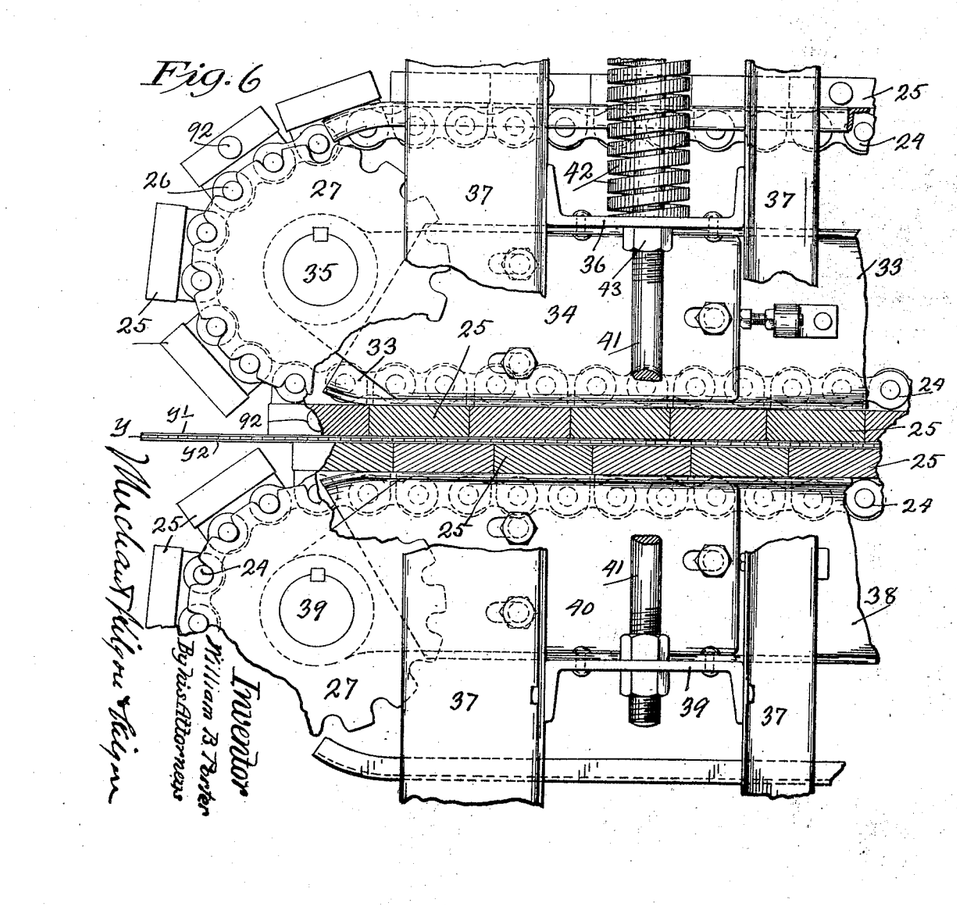
Fig. 6 is a fragmentary view on a scale larger than the other views, showing the receiving end of the endless belt press, some parts being shown in elevation, some parts being sectioned and some parts being broken away.

The numeral 38 indicates longitudinal laterally spaced beams that underlie and are spaced from the beams 33 and are rigidly secured to cross tie bars 39, which, in turn, are rigidly secured to the guide posts $29^a$ and 37. Here it should be noted, see particularly Figs. 4, 5 and 6, that the lower beams 38 afford skids on which the operative presser bars 25 of the lower press belt slide and that the upper beams 33, likewise, afford skids under and against which the operative presser bars 25 of the upper press belt are arranged to slide. Said beams 33 and 38, therefore, hold the operative opposing bars of the press belts parallel while operative to press and carry the compo board through the press.

The lower front sprockets 27 are secured to a transverse shaft 39 journaled in bearing plates 40 that are rigidly but adjustably secured to the front ends of the lower beams 38. Adjustments of the bearing plates 34 and 40 will serve to keep the upper and lower press belts and chains properly tightened up.

To produce the proper yielding pressure on the compo board, as it passes between the press belts, I preferably provide adjustable spring tension devices comprising nut-equipped rods 41 and coiled springs 42. The rods 41 are anchored at their lower ends to the outer ends of the lower fixed cross bars 39 and are passed through perforations in the outer ends of the upper cross bars 32. Nuts 43, on the rods 41, limit the downward movements of the upper cross bars and, hence, of the upper press belt and its supporting frame. The coiled springs 42 are compressed between the upper beams and adjustable stops, such as nuts and washers 44 on the upper ends of said rods. Obviously, by adjusting the nuts 44, the compressive force which the press will produce on the compo board while the elements thereof are being pressed together and the glue or cement is getting to initial set, may be varied at will.

For causing the two press belts to travel at the same speed with their opposing portions moving in the same direction, the shafts 28 and 30, respectively, are provided with spur gears 45 and 46, which, in practice, will have quite long intermeshing teeth which will run in good driving contact when the distance between the two shafts 28 and 30 is somewhat varied by slight movements of the upper press belt in respect to the lower.

Power for moving the belts of the press is, in the arrangement illustrated, transmitted through a power-driven belt 47 that runs over a pulley 47ª on a countershaft 48 journaled in suitable bearings on the lower floor 11 and provided with a spur pinion 49. The pinion 49 meshes with a spur gear 50 and a countershaft 51 journaled in the bearing frame 29 and provided with a spur pinion 52. The pinion 52 meshes with a spur gear 53 carried by a countershaft 54, also journaled in the frame 29 and provided with a spur pinion 54 that meshes with a spur gear 55 on one end of the sprocket shaft 28.

The saw mechanism is mounted on the supporting table 56 secured on the lower floor 11 in position to receive the compo board from the continuously acting press. For carrying the saw in the direction of the travel of the compo board on the table 56, I provide a so-called main or primary carriage 57 provided with grooved wheels 58 that run on rails 59 on said table 56.

Figures 2, 3:
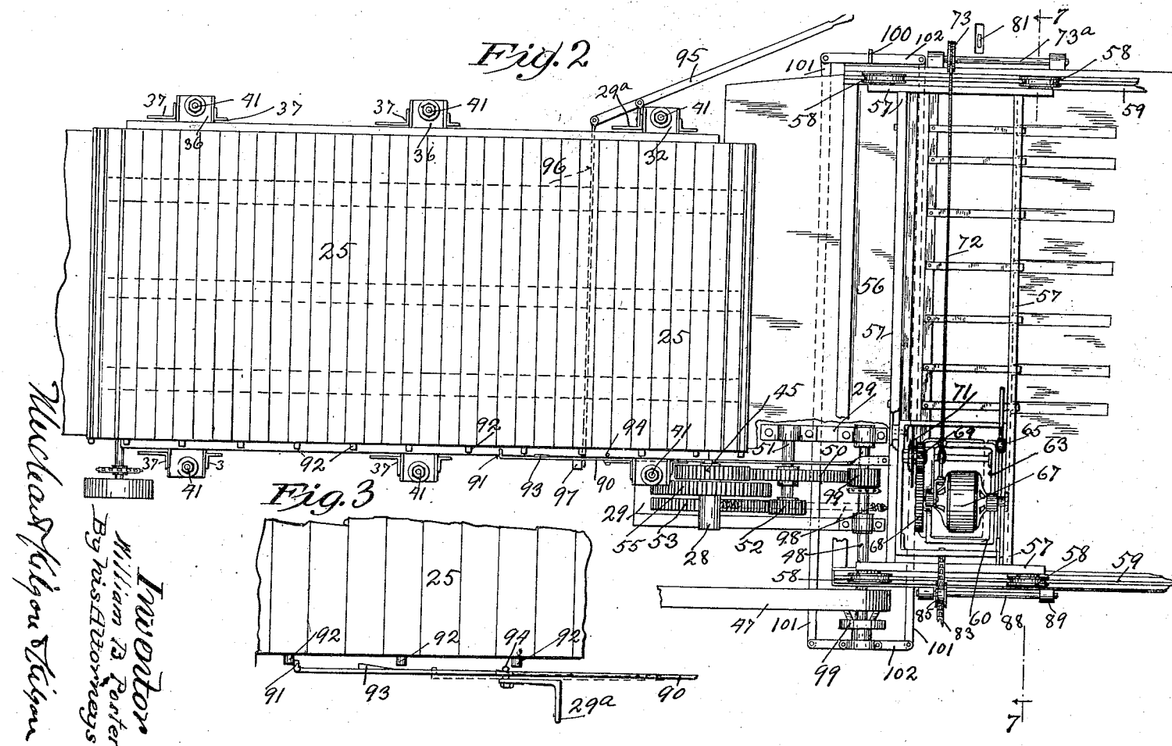
Fig. 2 is a plan view of the press and sawing mechanism, some parts being broken away, some parts being shown on a larger scale than Fig. 1.
Fig. 3 is a fragmentary plan view showing in detail a portion of one of the press belts and a primary or main saw carriage propelling device.
Figures 7, 8, 9, 10:
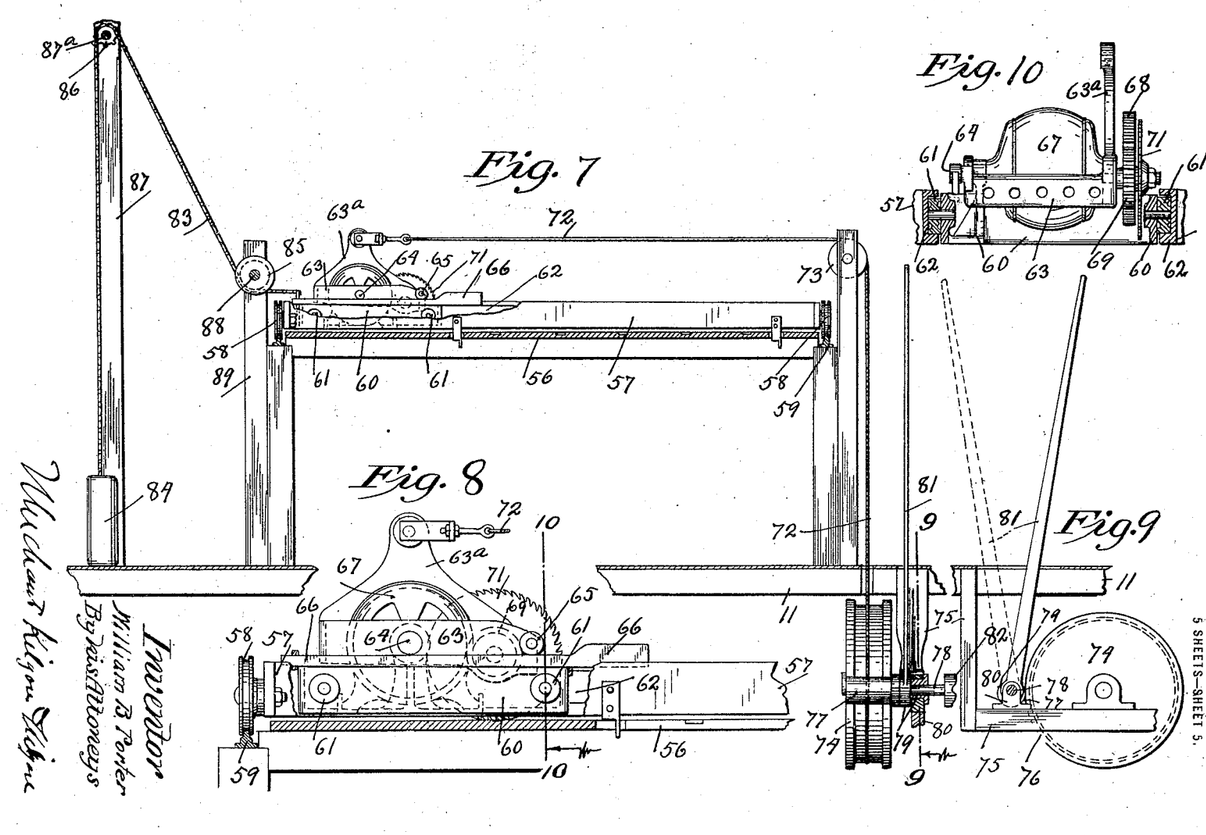
Fig. 7 is a transverse section taken approximately on the line 7—7 of Fig. 2.
Fig. 8 is a detail on a larger scale than in Fig. 7, showing certain parts at the left in Fig. 7, some on the same section line as Fig. 7 and some parts being broken away.
Fig. 9 is a detail in section taken approximately on the line 9—9 of Fig. 7.
Fig. 10 is a section taken approximately on the line 10—10 of Fig. 8.

For carrying the saw in a transverse direction that is at right angles to the direction of travel of the compo board on the table 56, I provide an auxiliary or secondary carriage 60 provided with wheels 61 that run in grooved transverse rails 62 on the primary carriage 57, see particularly Figs. 2, 8 and 10. This secondary carriage 60 has a supplemental frame 63 intermediately pivoted thereto at 64 for rocking movements and provided at its right-hand end with a roller 65 that rests on a cam bar 66 that is mounted for horizontal sliding movements on one side of the secondary carriage frame 60 and has a raised surface at that end shown at the right in Fig. 8, but which, in the machine, is properly designated as its left-hand end. For driving the saw, I preferably employ an electric motor 67 mounted on the rocking supplemental frame 63 with its axis coincident with the axis of the pivot 64. The armature shaft of this motor carries a spur gear 68 that meshes with a spur pinion 69 carried by a short shaft 70 journaled in the front portion of the rocking supplemental frame 63 and, at its rear end, carrying a circular saw 71. The saw 71, of course, is in a plane at right angles to the direction of the travel of the compo board on the table 56, and is of such diameter that it will saw off the compo board located immediately below the primary carriage 57, when the cam bar 56 is moved so that the roller 65 rests on its reduced or low portion. When the cam bar 66 is moved toward the left in respect to Fig. 8, or toward the right in respect to a person standing at the receiving end of the machine, the high portion of the cam bar 66 will be moved under the roller 65, thereby rocking the frame 63 and lifting the saw 71 so that its lower portion will be above the compo board on the table 56. This makes it feasible to drive the saw at operative speed even when it is not at work, and eliminates the necessity of starting and stopping the saw for each sawing action.

At one side, the rocking supplemental frame 63 has a raised arm 63ª to which a cable 72 is attached. This cable 72 is extended across and over the machine and over a guide sheave 73 journaled on a shaft 73ª supported by posts of the main frame, and from thence it is extended downward through the floor 11 and attached to a drum 74, (see Figs. 1 and 7), journaled to a bracket 75 supported from said floor. This drum 74 has peripheral flanges that are concentric except for clearance notches 76.

The numeral 77 indicates a small driving roller secured to the end of a short shaft 78 journaled in an eccentric 79 mounted in a bearing 80 suspended from the floor 11. The eccentric 79 has a lever 81 that extends up through the floor 11 where it may be operated to oscillate the eccentric 79. At one end, the shaft 78 has a small sheave or pulley 82, which adapts the roller 78 to be constantly driven from a power driven belt not shown.

When the power driven roller 77 is forced into frictional contact with the flanges of the drum 74, the latter will be rotated, thereby unwinding the cable 72 on said drum and causing the secondary saw carriage, with the saw and motor, to travel from the right-hand to the left-hand side of the machine and, at the same time, the tension on said cable will keep the saw forced down to its work. For retracting the secondary saw carriage and for normally holding the same at the right-hand side of the machine or at the left, as shown in Fig. 7, I provide a cable or chain 83 attached to the carriage frame 60 at one end and provided at its other end with a weight 84. Said cable 83 runs under a guide sheave 85 and over a guide sprocket or wheel 86. The sprocket 86 is slidably mounted on a shaft 87ª supported by the upper ends of the fixed posts 87, while the guide sheave 85 is journaled and mounted for sliding movements on a horizontal spindle 88 supported at its ends by fixed posts 89.

For causing the primary saw carriage, and, hence, the secondary saw carriage, to travel with the moving compo board during the time the saw is in action, I provide a long horizontally disposed so-called push bar 90, which, at its rear end, (see Figs. 2 and 4), is directly attached to the primary saw carriage frame 57 and, at its front end, has an offset lug 91 that is adapted to be engaged by lugs 92 applied at suitable intervals to the ends of certain of the presser bars 25 of the upper belt of the press. Just rearward of the lug 91, the push bar 90 has a beveled cam surface 93, and, at a considerable distance rearward of said cam surface, said push bar 90 is adapted to slide through and move laterally in a guide yoke 94, shown as supported by one of the posts 29. The lugs 92, on the upper presser belt, will normally clear the lug 91 of the push bar 92, as well as the guide bracket 94.

For moving the push bar 90 from its normal position into a position in which its lug 91 will be within the path of movement of the approaching belt lug 92, I have shown a lever 95 pivoted to one of the left-hand posts 29ª, with its short end connected to a rod 96 extended through the machine and provided at its right-hand end with a head or bar 97.

For returning the primary saw carriage 57 to normal position when released, I have, as shown, provided a long coiled spring 98, which, as shown, is attached to said frame and to the bracket 31.

For throwing the entire machine out of action when desired, I have shown a mechanism comprising a clutch 99, which normally connects the pulley 47ª to the countershaft 48. This clutch is adapted to be released from a lever 100, at the left-hand side of the machine, through a shifting frame made up of cross bars 101 and end bars 102.

Operation.

The operation, in a general way, has probably been made clear from the foregoing description, but may, with advantage, be briefly summarized as follows:

The wooden slats $y$ will be fed into the magazine 13 preferably by hand, but from the magazine, the slats will be automatically delivered between the two paper sheets $y^1$ and $y^2$, and the assembled compo board forming elements, including the cement or glue, will be delivered to and passed through the endless belt press in a manner already described, and from the press, the compo board will be delivered onto the table 56 and under the frame of the primary saw carriage 57. When the compo board is fed onto the said table approximately the length to which it should be sawed off, the operator, by manipulation of the lever 95, pulls the free front end of the push bar 90 inward so that its end lug 91 will be engaged by the immediately approaching belt lug 92. As soon as said lug 92 engages the lug 91, the push bar 90 and, hence, the primary saw carriage, will commence to move rearward at a speed exactly corresponding to the speed of the press belts and of the compo board; and as the secondary saw carriage moves on the primary saw carriage, it is evident that the initial rearward movement of the latter determines the length of compo board that will be sawed off by the next sawing operation. To start the saw into action, the operator, by manipulation of the lever 81, throws the driven roller 77 into frictional engagement with the drum 74, thereby causing the cable 72 to be wound on said drum and the secondary saw carriage to be moved from the right-hand to the left-hand side of the machine, or from the left toward to right in respect to Fig. 7. This causes the saw to be pressed downward and to saw off the outer portion of the compo board. Obviously, the saw acts while moving rearward with the compo board and, hence, saws the same crosswise at a right angle of the travel of said board. When the saw has cut off the compo board and is moved a little further, the cam bar 66 strikes the left-hand side of the frame of the primary saw carriage and raises the saw out of action and into a position in which it will clear the compo board while making its return movement, as already clearly described.

Just before the frame of the secondary carriage would otherwise be thrown into contact with the left-hand side of the frame of the primary carriage, the notches 76, of the drum 74, come into alignment with the driving roller 77 and thereby cause stopping of the rotation of the drum. When the lever 81 is thrown back to its normal position shown in Fig. 9, the roller 77 will be moved into an inoperative position and the weight 84, acting through the cable 83, will move the secondary saw carriage back to its normal position at the right-hand side of the machine, or at the left as shown in Fig. 7.

At a time after the saw has completely cut off the compo board by movement from the right toward the left, the cam surface 93, on the push bar 90, will come into contact with the yoke 94, thereby forcing the end lug 91, of said push bar, out of engagement with the previously operating lug 92, out of the path of movement of the approaching lugs 92, so that the spring 98 will then become operative to return the primary saw carriage to its normal position shown in Fig. 2, whereupon the machine is ready to repeat the sawing actions just described.

The machine is herein designated as a compo board machine but, of course, it is capable of use for making any kind of composition board or like material out of facing sheets and filling strips or material.

What I claim is:

1. In a compo board machine, the combination with an endless belt press and means for supplying assembled board-forming elements thereto, of a power driven saw, and means for causing the same to travel with the moving compo board and to move transversely thereof to cut the same in sections while thus travelling.

2. In a compo board machine, the combination with an endless belt press and means for supplying assembled board-forming elements thereto, of a power driven saw, means for causing the same to travel with the moving compo board and to move transversely thereof to cut the same in sections while thus travelling, and means tending to yieldingly hold and acting to restore said saw to normal position at one side of the board.

3. In a compo board machine, the combination with an endless belt press and means for supplying assembled board-forming elements thereto, of a table receiving the formed board from said press, a saw and a saw-driving motor, means for causing said saw and motor to travel with the board on said table, and to move transversely of said board to cut the same in sections while travelling with the board, and yielding means tending to hold and serving to restore said saw and motor to normal positions at one side of the board.

4. In a compo board machine, the combination with an endless belt press and means for supplying assembled board-forming elements thereto, of a table receiving the formed board from said press, a primary saw carriage movable longitudinally of said table, a secondary saw carriage movable transversely on said primary saw carriage, a saw and a saw-driving motor mounted on said secondary carriage, means for causing said primary carriage to travel with the moving compo board, and means for moving said secondary carriage transversely of the machine to cause said saw to cut the board in sections while said primary and secondary carriages are moving with the board.

5. In a compo board machine, the combination with an endless belt press and means for supplying assembled board-forming elements thereto, of a table receiving the formed board from said press, a primary saw carriage movable longitudinally of said table, a secondary saw carriage movable transversely on said primary saw carriage, a saw and a saw-driving motor mounted on said secondary carriage, means for causing said primary carriage to travel with the moving compo board, means for moving said secondary carriage transversely of the machine to cause said saw to cut the board in sections while said primary and secondary carriages are moving with the board, and yielding means tending to hold and serving to restore said primary and secondary carriages to normal positions.

6. In a compo board machine, the combination with an endless belt press and means for supplying assembled board-forming elements thereto, of a table receiving the formed board from said press, a primary saw carriage movable longitudinally of said table, a secondary saw carriage movable transversely on said primary saw carriage, a saw and a saw-driving motor mounted on said secondary carriage, means for causing said primary carriage to travel with the moving compo board, means for moving said secondary carriage transversely of the machine to cause said saw to cut the board in sections while said primary and secondary carriages are moving with the board, and means for automatically lifting the saw above the compo board at the completion of its sawing movement.

7. In a compo board machine, the combination with an endless belt press and means for supplying assembled board-forming elements thereto, of a table receiving the formed board from said press, a primary saw carriage movable longitudinally of said table, a secondary saw carriage movable transversely on said primary saw carriage, a saw and a saw-driving motor mounted on said secondary carriage, means for causing said primary carriage to travel with the moving compo board, means for moving said secondary carriage transversely of the machine to cause said saw to cut the board in sections while said primary and secondary carriages are moving with the board, yielding means tending to hold and serving to restore said primary and secondary carriages to normal positions, and means for automatically lifting the saw above the compo board at the completion of its sawing movement.

8. In a compo board machine, the combination with an endless belt press and means for supplying assembled board-forming elements thereto, of a table receiving the formed board from said press, a primary saw carriage movable longitudinally of said table, a secondary saw carriage movable transversely on said primary saw carriage, a saw and a saw-driving motor mounted on said secondary carriage, means for causing said primary carriage to travel with the moving compo board, and means for moving said secondary carriage transversely of the machine to cause said saw to cut the board in sections while said primary and secondary carriages are moving with the board, said means for causing said primary carriage to travel with the board comprising a push bar attached to said primary carriage and having means for intermittently coupling the same to a movable part of said press.

9. In a compo board machine, the combination with an endless belt press and means for supplying assembled board-forming elements thereto, of a table receiving the formed board from said press, a primary saw carriage movable longitudinally of said table, a secondary saw carriage movable transversely on said primary saw carriage, a saw and a saw-driving motor mounted on said secondary carriage, means for causing said primary carriage to travel with the moving compo board, means for moving said secondary carriage transversely of the machine to cause said saw to cut the board in sections while said primary and secondary carriages are moving with the board, and yielding means tending to hold and serving to restore said primary and secondary carriages to normal positions, said means for causing said primary carriage to travel with the board comprising a push bar attached to said primary carriage and having means for intermittently coupling the same to a movable part of said press.

10. The combination with a compo board press comprising endless presser belts and means for moving the opposing portions thereof in the same direction and at the same speed, of a table receiving the board from said press, a primary saw carriage movable longitudinally of said table, a push bar connected to said primary carriage and engageable with driving elements on one of said press belts, and a saw movable on said primary carriage transversely of the machine to cut the board in sections while travelling therewith.

11. The combination with a continuously acting board press, of a primary saw carriage movable longitudinally of the board delivered from said press, means for intermittently causing said primary carriage to travel with the moving board, a secondary saw carriage movable on said primary saw carriage transversely of the machine and having a rocking frame, a motor-driven saw mounted on said rocking frame, means for causing said secondary carriage to move transversely of the board while said saw is lowered for action to cut off the board, and automatic means for rocking said frame to lift said saw above the board at the completion of its sawing movements.

12. The combination with a continuously acting board press, of a primary saw carriage movable longitudinally of the board delivered from said press, means for intermittently causing said primary carriage to travel with the moving board, a secondary saw carriage movable on said primary saw carriage transversely of the machine and having a rocking frame, a motor driven saw mounted on said rocking frame, means for causing said secondary carriage to move transversely of the board while the said saw is lowered for action to cut off the board, automatic means for rocking said frame to lift said saw above the board at the completion of its sawing movements, said primary and secondary saw carriages being under yielding strain to return to normal position when released, and means for releasing said carriages.

13. The combination with a continuously acting board press, of a primary saw carriage movable longitudinally of the board delivered from said press, means for intermittently causing said primary carriage to travel with the moving board, a secondary saw carriage movable on said primary saw carriage transversely of the machine and having a rocking frame, a motor driven saw mounted on said rocking frame, means for causing said secondary carriage to move tranversely of the board while said saw is lowered for action to cut off the board, automatic means for rocking said frame to lift said saw above the board at the completion of its sawing movements, and anchored spring serving to return said primary carriage to normal position, and a weighted cable connected to said secondary saw carriage and serving to return the same to normal position.

14. The combination with a compo board press comprising endless presser belts and means for moving the same, of a primary saw carriage movable longitudinally of the machine beyond the delivery end of said press, a push bar connected to said primary carriage, projections on one of the presser belts for engaging the free end of said push bar, said push bar having a releasing cam, a guide operative on said cam surface to release said push bar at the limit of the predetermined movement, means for engaging said push bar with a co-operating projection of said presser belt, and a saw mounted to travel on said primary carriage, transversely of the machine, to thereby cut the compo board while travelling with the same.

15. The combination with a compo board press comprising endless presser belts and means for moving the same, of a primary saw carriage movable longitudinally of the machine beyond the delivery end of said press, a push bar connected to said primary carriage, projections on one of the presser belts for engaging the free end of said push bar, said push bar having a releasing cam, a guide operative on said cam surface to release said push bar at the limit of the predetermined movement, means for engaging said push bar with a co-operating projection of said presser belt, a saw mounted to travel on said primary carriage, transversely of the machine, to thereby cut the compo board while travelling with the same, and a saw-driving motor mounted to move with said saw.

16. The combination with a compo board press comprising endless presser belts and means for moving the same, of a primary saw carriage movable longitudinally of the machine beyond the delivery end of said press, a push bar connected to said primary carriage, projections on one of the presser belts for engaging the free end of said push bar, said push bar having a releasing cam, a guide operative on said cam surface to release said push bar at the limit of the predetermined movement, means for engaging said push bar with a co-operating projection of said presser belt, a saw mounted to travel on said primary carriage, transversely of the machine, to thereby cut the compo board while travelling with the same, and a saw-driving motor mounted to move with said saw, means for automatically lifting said saw out of action at the limit of its sawing movement, and means for lowering the saw in position for action when said saw is restored to normal position.

In testimony whereof I affix my signature.

WILLIAM B. PORTER.